United States Patent [19]

Willinger et al.

[11] Patent Number: 4,761,227

[45] Date of Patent: Aug. 2, 1988

[54] SELF PRIMING AQUARIUM FILTER

[75] Inventors: Allan H. Willinger, Oakland; Klaus Woltmann, Demarest, both of N.J.

[73] Assignee: Willinger Bros., Oakland, N.J.

[21] Appl. No.: 32,046

[22] Filed: Mar. 27, 1987

[51] Int. Cl.$^4$ .............................................. E04H 3/20
[52] U.S. Cl. ................................ 210/169; 210/416.2; 119/5; 137/576
[58] Field of Search ................. 210/169, 416.2; 119/5; 137/571, 576

[56] References Cited

U.S. PATENT DOCUMENTS

| | | | |
|---|---|---|---|
| 3,669,297 | 6/1970 | Willinger | 210/169 |
| 3,892,663 | 7/1975 | Wiedenmann | 210/169 |
| 4,512,885 | 4/1985 | Willinger | 210/169 |
| 4,602,996 | 7/1986 | Willinger | 210/169 |
| 4,645,593 | 2/1987 | Dank et al. | 210/169 |

Primary Examiner—Peter Hruskoci
Assistant Examiner—Coreen Y. Lee
Attorney, Agent, or Firm—Helfgott & Karas

[57] ABSTRACT

An aquarium filter for mounting externally of an aquarium tank. The filter includes an intake chamber for receiving contaminated aquarium water from the aquarium tank and a filtering chamber in flow communication with the intake chamber for filtering of the contaminated water and subsequent return of the clean water back to the aquarium tank. An impeller unit driven by a rotor magnetically coupled to a removably attached electromagnetic stator unit serves to draw the water from the aquarium tank to the intake chamber through a removable intake tube assembly. A partition wall separates the intake chamber from the filtering chamber for the water filling the intake chamber to overflow the partition wall into the filtering chamber. Upon stoppage of the impeller, the water from the intake chamber siphons back into the aquarium tank. A narrow passageway provided in the partition wall provides a limited reverse flow of water from the filtering chamber back to the intake chamber upon drainage of the water from the intake chamber due to this siphoning action. After the siphon breaks, this reverse flow remains in the intake chamber to self-prime the filter for restarting.

26 Claims, 5 Drawing Sheets

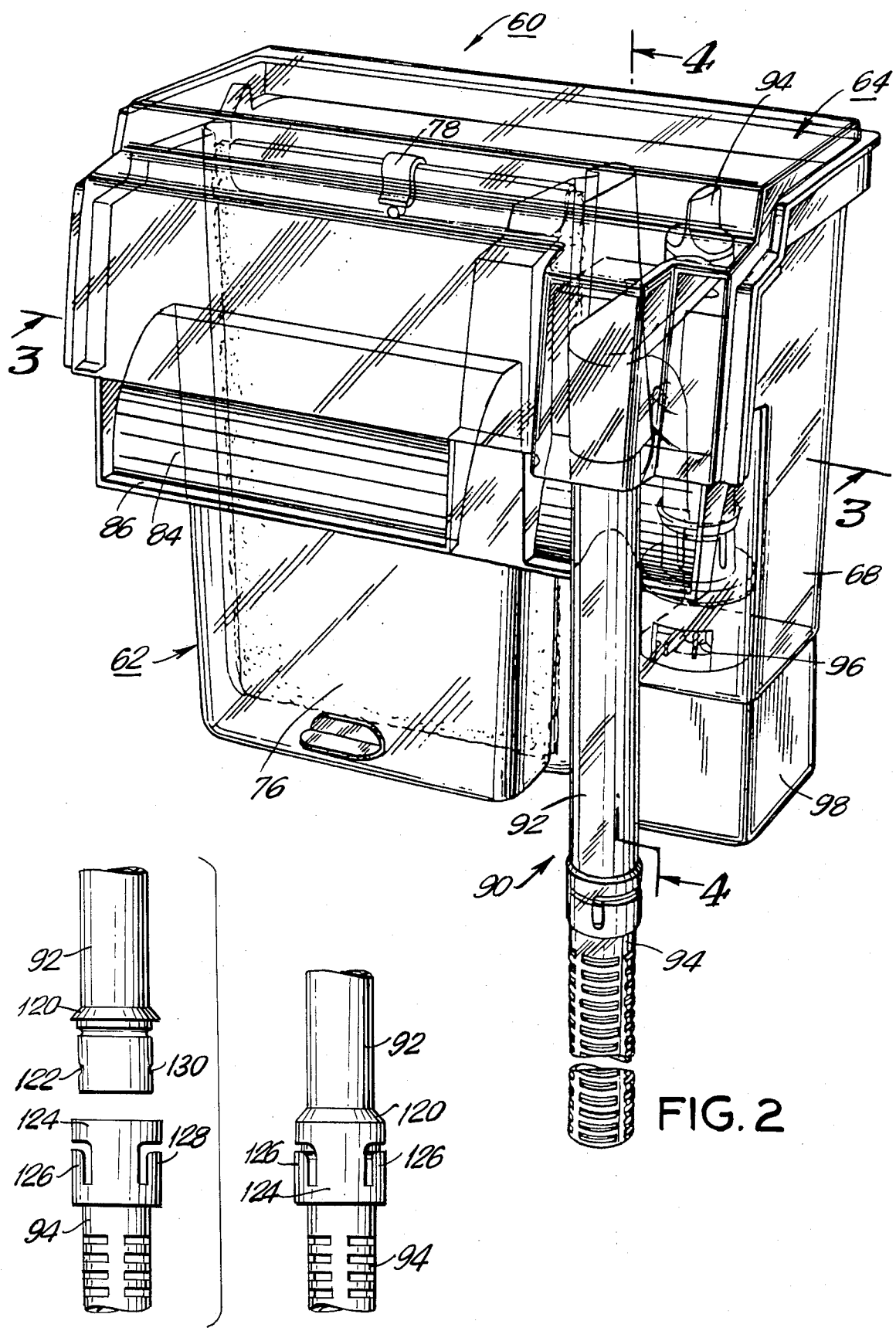

SELF PRIMING AQUARIUM FILTER

BACKGROUND OF THE INVENTION

This invention relates to aquarium filters, and more particularly to an external aquarium filter which is self priming to restart the filter after the filter stops as a result of halting of the impeller pump of the filter unit.

External aquarium filters are used for providing filtration and aeration of the aquarium water in an aquarium tank. The external aquarium filter is typically mounted on a wall of the aquarium tank and includes a pump such as an impeller unit for drawing water from the aquarium tank into the filter. The water passes through filtration material in the filter and is then returned to the aquarium tank in filtered condition. As the water flows back into the aquarium tank it picks up air and provides the necessary aeration of water.

One such external aquarium filter is described in U.S. Pat. No. 4,512,885 entitled Aquarium Filter Assembly and assigned to the Assignee of the present invention. In that patent there is described an external aquarium filter having a removable intake assembly having one end insertable in the aquarium tank. The other end of the intake assembly fits into an intake chamber in the aquarium filter and supports a centrifugal pump means, such as an impeller, which is positioned adjacent the bottom of the intake chamber. The impeller is located on a rotor which depends through an aperture at the bottom of the intake chamber. Coupled to the aperture is an encapsulated electromagnetic stator unit having a well which is hermetically separated from the electromagnetic unit and receives the rotor. The rotor is magnetically coupled to the stator unit and serves to drive the impeller.

In operation, the impeller draws water from the aquarium tank through the intake assembly into the intake chamber. The intake chamber is separated by a partition wall from a filtering chamber in the filter. As the water fills the intake chamber it overflows the partition wall and enters the filtration chamber where it passes through filtration material. The filtration material can typically include a porous envelope filled with filtration material such as carbon, and the like. As the water passes through the filtration material it is filtered and then flows over a spillway back into the aquarium tank.

Occasionally, the filter stops operating because of various unpredictable problems that may accidentally occur. For example, a large piece of debris may enter the intake assembly and get lodged in the impeller unit thereby locking the impeller and preventing its rotation. A power failure may also occur at which time the electromagnetic stator unit will have deenergized thereby stopping rotation of the impeller unit. Other such accidental occurrences may occur. When this happens, the water in the intake chamber begins siphoning out through the intake assembly and back into the aquarium tank. Such siphoning continues until the intake chamber is drained completely.

The reason for the stoppage may go undetected by the aquarium owner. For example, should there be a power failure while the owner is away from the premises, the user may not be aware of the power failure. During this time the filter will drain. When the power is returned, the filter will not begin by itself since the filter must be primed before it can restart. Specifically, water must be placed in the intake chamber sufficient to cover the impeller unit so that the impeller can cause a suction of the aquarium water through the intake assembly. Without priming, the filter unit will not restart. Therefore, even if the power is restarted, the filter unit will not begin pumping.

On the other hand, should the stoppage be as a result of a blockage of dirt, the unit will not start repumping until the blockage is cleared. During this time, however, the electromagnet unit remains energized and generates heat which may damage the aperture in which the stator is connected and the surrounding area of the aquarium filter.

Accordingly, it would be advantageous if the aquarium filter would not overheat should there be a blockage and should also be able to restart itself without requiring attention of the owner should the problem be a power failure.

SUMMARY OF THE INVENTION

It is accordingly an object of the present invention to provide a self priming aquarium filter which can restart itself without the need of a user providing an additional supply of water for priming the pump.

A further object of the present invention is to provide an external aquarium filter which can restart itself through a self priming action following stoppage of the aquarium filter.

Yet another object of the present invention is to provide an improved external aquarium filter which can avoid damage to the filter upon stoppage of the filter through accidental reasons.

Still a further object of the present invention is to provide an external aquarium filter which is self priming after stoppage of the filter, whereby the filter can be in a position to restart itself upon removal of the cause of the stoppage.

Briefly, the present invention provides an aquarium filter for mounting externally of the aquarium tank. The filter includes an intake chamber for receiving contaminated aquarium water from the aquarium tank. A filtering chamber is provided in the aquarium filter which is in flow communication with the intake chamber and in which the contaminated water is filtered for subsequent return of the clean water back to the aquarium tank. A partition wall separates the intake chamber and the filtering chamber. The water filling the intake chamber overflows the partition wall and flows into the filtering chamber.

An intake assembly is removably inserted into the intake chamber and in flow communication with the aquarium tank. The intake assembly includes an intake tube having one end which can be placed in the aquarium tank and the other end placed in the intake chamber. At the end of the intake tube is an impeller unit situated near the bottom of the intake chamber. The impeller unit is located on a rotor which depends through an aperture in the intake chamber. An electromagnetic stator unit is coupled to the intake chamber through the aperture and includes a well which is hermetically separated from the electromagnetic stator unit and receives the depending rotor. The rotor is magnetically coupled to the electromagnetic stator unit to be rotatably driven thereby.

During normal operation, the impeller unit draws water through the intake assembly into the intake chamber. The water fills the intake chamber and overflows the partition wall into the filtering chamber. Upon ceasing of operation of the pump, the water from the intake chamber is siphoned out through the intake tube and flows back into the aquarium tank thereby draining the intake chamber.

The present invention includes a passageway through the partition wall for providing a limited reverse flow of water from the filtering chamber back into the intake chamber upon stoppage of the filter. The water flows at a rate less than the siphoning action, whereby the siphon will break before the reverse flow of the water has a chance to adequately fill the intake chamber. After the siphon breaks, the reverse flow continues a sufficient amount to cover the impeller unit so that the filter will be primed and ready for restarting upon resumption of operation of the impeller unit. If the stoppage was caused by a blockage of a piece of debris, the operation will probably not restart until the blockage is cleared. However, during the blockage, the presence of the water will serve to enter the well in the electromagnetic stator unit and keep the electromagnetic unit cool to avoid heat damage at the aperture connection between the electromagnetic unit and the intake chamber as well as to the filter housing itself.

The aforementioned objects, features and advantages of the invention will, in part, be pointed out with particularity, and will, in part, become obvious from the following more detailed description of the invention, taken in conjunction with the accompanying drawing, which forms an integral part thereof.

BRIEF DESCRIPTION OF THE DRAWINGS

In the drawing:

FIG. 1A shows the normal flow of operation of the aquarium water through the filter;

FIG. 1B shows a reversal of flow of the water due to a siphoning action when power to the pump is interrupted or stopped, so that the pump is no longer operating;

FIG. 1C shows draining of the intake chamber that occurs with prior art filters due to the siphoning;

FIG. 1D shows the presence of the narrow passageway in the partition wall which permits a continued trickle flow back from the filtering chamber to the intake chamber, and FIG. 1E shows the resultant water retained in the intake chamber for self-priming of the filter for restarting of the filter operation;

FIG. 2 is a perspective view of an external aquarium filter in accordance with the present invention;

FIG. 7 is an exploded view showing the interconnection of the strainer to a modified end of the intake tube; and FIG. 8 is a composite view of the parts shown in FIG. 7.

In the various figures of the drawings like reference characters designate like parts.

DESCRIPTION OF THE PREFERRED EMBODIMENT

Figure 1A:
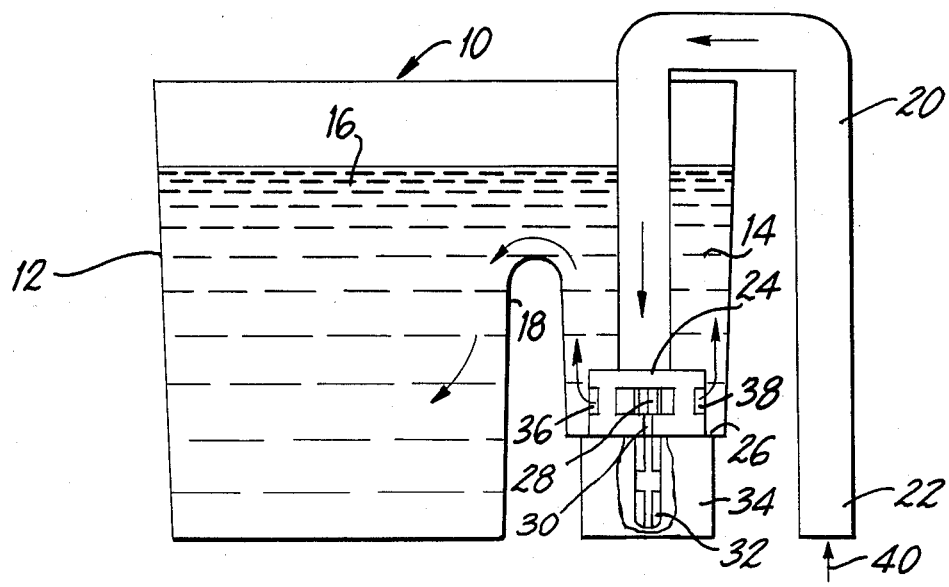
FIGS. 1A-1E are schematic diagrams which are useful in explaining the theory of operation of the present invention including the narrow passageway for permitting self-priming of the pump, specifically.

Referring now to FIGS. 1A-1E, there will be described the theory of operation of the present invention for comparison with the prior art for specifically pointing out the improvement provided by the present invention to achieve a self-priming function for the aquarium filter. FIG. 1A schematically shows an aquarium filter unit shown generally at 10 comprising a filter housing 12 including an intake chamber 14 and a filtering chamber 16 which are separated by a partition wall 18. An intake tube 20 has one end 22 available for positioning in the aquarium tank and its other end connected to intake assembly 24 which is assembled with the neck extension from the stator unit 34 located adjacent the bottom 26 of the intake chamber 14. An impeller unit 28 rotates within the intake assembly 24 of the intake chamber and serves to draw water through the intake tube 20 into the intake chamber 14. The impeller unit is positioned on a rotor 30 which extends downwardly into a well 32 in an encapsulated electromagnetic stator unit 34 which is removably coupled to the bottom 26 of the intake chamber 14. The well 32 is hermetically separated from the surrounding electromagnetic stator unit. It is in flow communication with the intake chamber so that water in the intake chamber can fill the well and circulate around the rotor. The rotor is magnetically coupled to the stator unit to be rotatably driven thereby to also rotate the impeller unit 28.

In normal operation, prior to beginning use of the filter, the aquarium filter is primed by placing a small amount of water in the intake chamber so that the water fills the well 32 and rises sufficiently in the intake chamber to cover the impeller unit 28. Upon energizing of the electromagnetic unit by connection to a source of electric power, the impeller begins to rotate thereby centrifugally distributing the water through the openings 36, 38, in the neck portion of the stator unit 34. This causes a reduction in pressure whereby additional water from the aquarium tank is sucked into the intake tube 20, as shown by the arrow 40. The water flows up through the intake tube 20 and is drawn into the intake chamber 14. The water fills the intake chamber until it is of a height sufficient to overflow the partition wall 18. The water then flows into the filtering chamber 16. Filtration material provided in the filtering chamber 16 is used to filter the water. The now filtered water is then passed back into the aquarium tank.

It will be noted, that the intake chamber 14 is separated from the filtering chamber by means of the partition wall 18. The reason for using the partition wall is to provide a separated intake chamber to thereby limit the amount of water required for initial priming. Because the intake chamber is smaller than the filtering chamber, the amount of water initially required is only such as is required to fill the bottom portion of the intake chamber. If the partition wall were not present, it would be necessary to fill the entire bottom of the filter which would represent a considerable amount of initial water required for priming or starting the filter.

Additionally, because of the presence of the partition wall, there is required a sufficient amount of water in the intake chamber to overflow the partition wall into the filtering chamber. The water thereby overflowing the partition wall causes a circulation of the water within the filtering chamber. Such circulation causes a distribution of the debris within the filtering chamber. In this way, there is a more uniform passage of the contaminated water through the filtration material thereby preventing local clogging of the filtration material and an uneven distribution of the filtering capability through the filtering chamber.

Figure 1B:
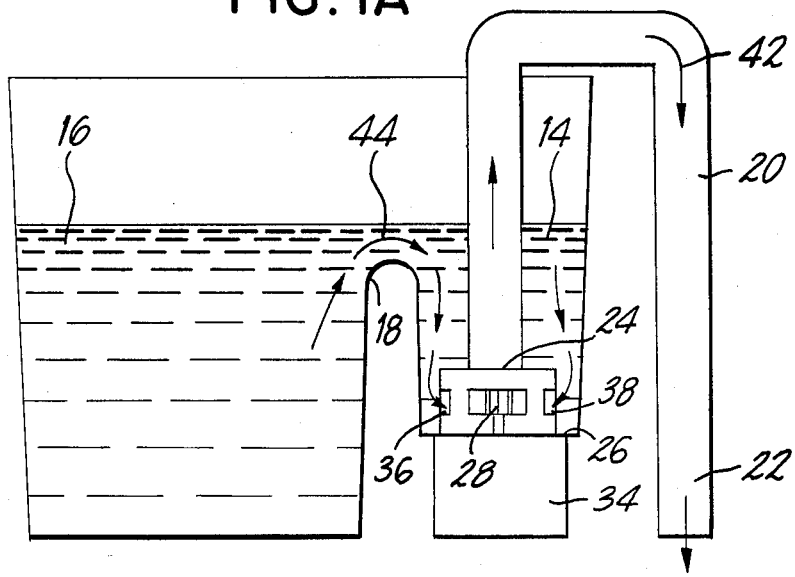

Referring now to FIG. 1B, it is assumed that power to the pump has been interrupted. This can occur during a power outage or power failure on the premises whereby the electromagnetic unit is no longer energized. Similarly, it could occur because a piece of debris getting stuck within the rotor or within the impeller unit.

When such stoppage occurs, there is no longer a sucking in of the water from the aquarium into the intake chamber 14. When such sucking stops, the water in the intake chamber 14 begins to reverse flow out of the intake chamber, as shown by the arrows 42 due to a siphoning action. It must be remembered, that the external aquarium filter is at a higher level than the aquarium tank water and therefore the siphoning will occur with the water flowing out of the intake chamber 14, through the intake tube 20, out the distal end 22 and back into the aquarium tank. In so doing, the water within the filtering chamber 16 begins to flow backward over the partition wall 18, as shown by the arrow 44.

Because of the presence of the partition wall 18, the water in the filtering chamber 16 will not be entirely depleted. It will only flow back until the height of the partition wall is reached after which no more water from the filtering chamber 16 passes into the intake chamber 14. However, all of the water in the intake chamber 14 will continue flowing out due to the siphoning action until the intake chamber 14 is completely drained. This situation is shown in FIG. 1C which would be the situation that would remain after the siphoning action takes place.

Figure 1C:
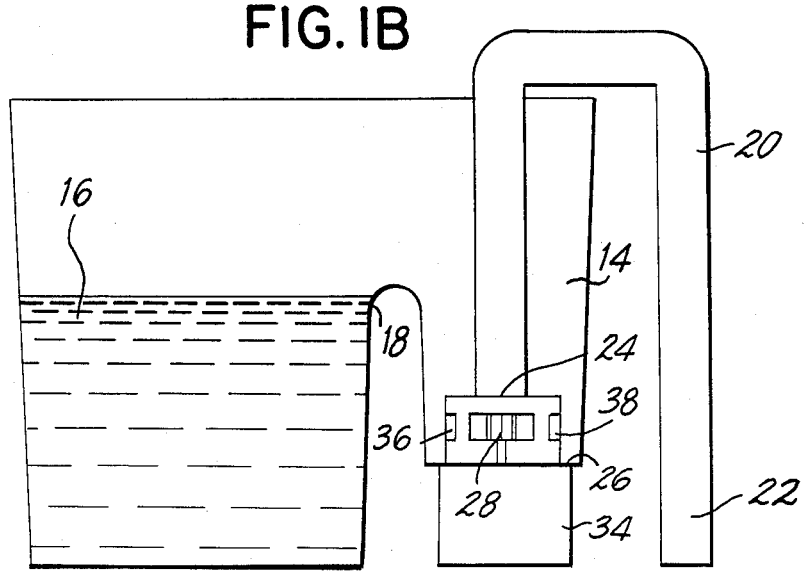

In the prior art, if the power to the electromagnetic stator unit 34 were again to resume, the filter would not begin but would remain in the stage shown in FIG. 1C. In order for the filter to begin, it must be primed whereby sufficient water is placed in the intake chamber 14 to cover the impeller unit 28 so that the impeller will be able to spread the water out through the openings 36, 38 and cause a reduced pressure thereby sucking in additional water. In the absence of such priming water, the filter will not restart and will remain in the state shown in FIG. 1C.

However, since the electricity will begin flowing to the electromagnetic unit 34, the unit 34 will heat up. Since there is no circulating water in the well 32 within the electromagnetic unit 34, the unit will continue to generate heat. This heat may cause damage to the bottom 26 of the intake chamber 14 and especially to the aperture through which the electromagnetic unit 34 is connected to the intake chamber 14.

Furthermore, since the user of the aquarium tank is unaware that the filter has stopped, unless the user specifically goes over and checks the filter, the situation may continue for a long time until it is noticed. In addition to causing damage to the filter unit, the failure of the filter to provide adequate filtration to the aquarium tank may cause damage and harm to the contents of the aquarium itself.

Figure 1D:
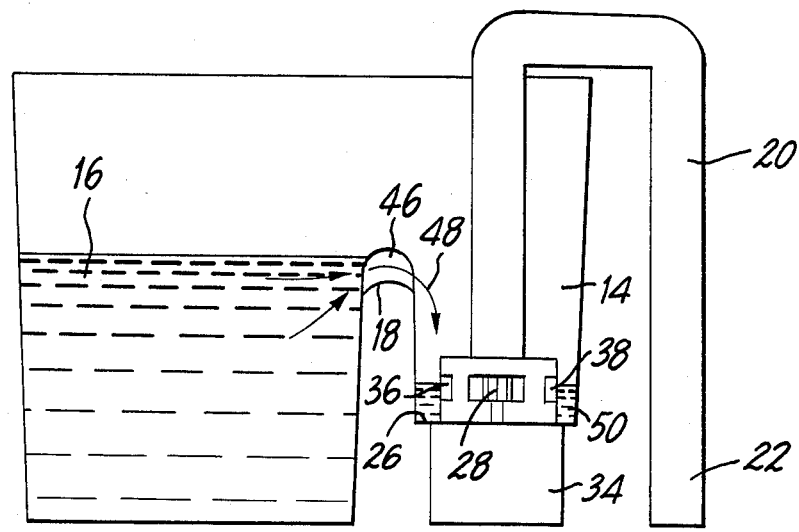

Referring now to FIG. 1D, there is shown the improvement of the present invention whereby a narrow passageway 46 is provided in the partition wall 18. The narrow passageway 46 is in the form of a depending channel extending downward from the top of the partition wall. The passageway has a cross-sectional area which is less than the cross-sectional area of the intake tube 20 to thereby provide a slow or trickle flow of reverse water through it.

Accordingly, after the majority of the water has flown over the partition wall, as shown in FIG. 1B, and when the water level of the filtering chamber has reached the upper end of the partition wall 18 as shown in FIG. 1C, there will still be a small trickle flow shown at 48 as shown in FIG. 1D which will flow through the narrow passageway 46 from the filtering chamber 16 back into the intake chamber 14. Since the cross-sectional area of the intake tube 20 is substantially larger than that of the passageway 46, the siphoning action will operate faster than the trickle flow 48. Therefore, the siphoning flow will cause the water to drain out of the intake chamber 14 faster than the trickle flow 48 flows into the chamber. As a result, the water will deplete from the filtering chamber beneath the level of the impeller 28 and beneath the openings 36, 38. When the water gets below such levels, the siphon breaks and no more water will flow outward from the intake chamber 14. When this occurs, the continuous trickle flow 48 passing through the narrow passageway will now begin accumulating at the bottom of the intake chamber, as shown by the water 50. This water will fill the well in the electro-magnetic stator unit 34 and begin filling the bottom of the intake chamber.

Figure 1E:
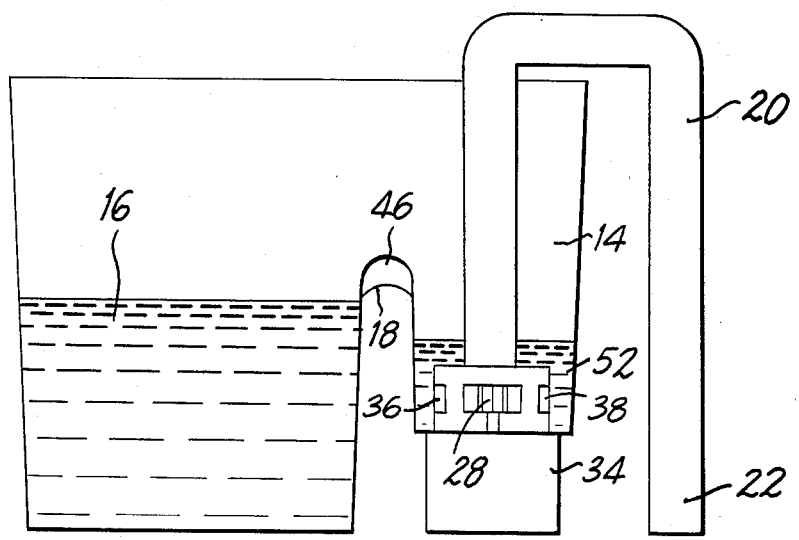
Figure 3:
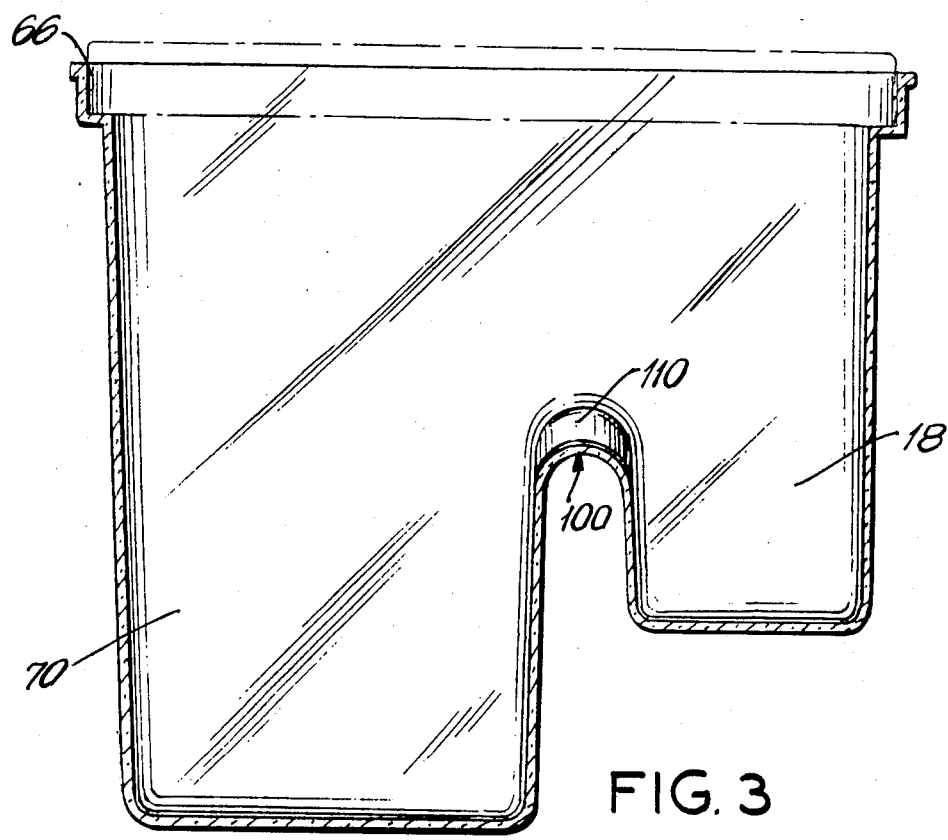
FIG. 3 is a cross-sectional view taken along lines 3—3 of FIG. 2.
Figure 4:
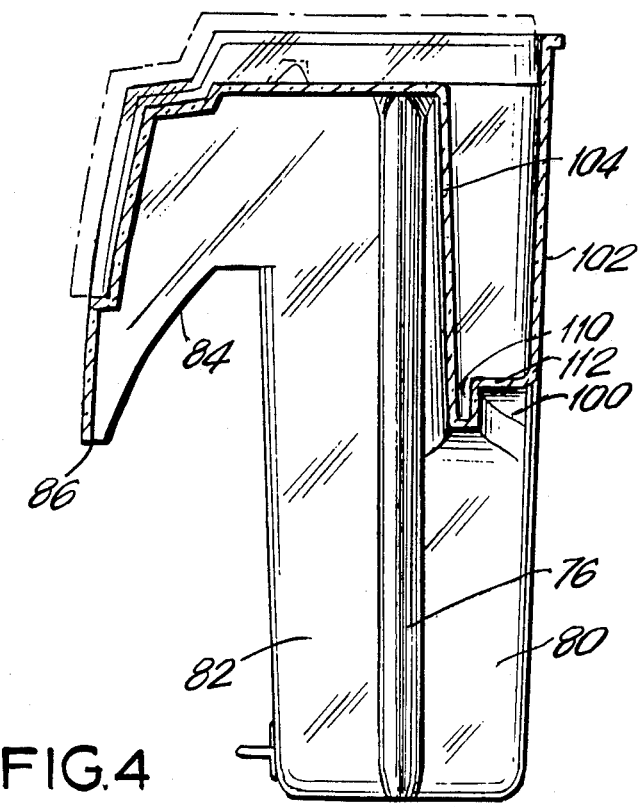
FIG. 4 is a cross-sectional view taken along lines 4—4 of FIG. 2.

The passageway 46 is sized so that a sufficient amount of water will trickle back in a reverse flow to the intake chamber 14 adequate to cover the impeller unit 28 and thereby provide sufficient priming water 52, as shown in FIG. 1E. Accordingly, in the filter of the present invention, when stoppage of the filter occurs due to an interruption of power, instead of the filter siphoning out and remaining in a position shown in FIG. 1C, the trickle flow will cause a self-priming of the filter so that the filter will remain situated in the condition shown in FIG. 1E. In this state, the filter is primed and ready for restarting once the power begins.

Upon resumption of power, the water 52 provides the priming which is needed to start the filter and the impeller 28 will again provide a reduced pressure so that water will begin flowing from the aquarium into the filter. As a result, even if the filter stops, and the user is unaware of the stoppage, the filter will automatically restart even in the absence of any action taken on the part of the user.

In order to facilitate the restarting action, it should be noted that the impeller unit is spaced above the bottom of the intake chamber, and the outlet of the intake assembly is also spaced above the bottom of the intake chamber. This aids in permitting the siphoning action to break prior to providing a sufficient trickle flow to reprime the filter.

Referring now to FIGS. 2–6, there is shown an embodiment of the present invention which is essentially an improvement on the aforementioned aquarium filter described in U.S. Pat. No. 4,512,885. Therefore, the filter will only be described in general terms. For more details of the filter itself, reference is had to the aforementioned U.S. patent.

The filter is shown generally at 60 and comprises a filter housing 62 having a removable cover 64 that snugly fits into a peripheral lip 66 about the top portion of the filter. The filter comprises an intake chamber 68 and a filtering chamber 70. The filtering chamber includes a pair of opposing notched grooves 72, 74 which can slidingly receive therein a removable filter cartridge 76 of the type described in a co-pending application Ser. No. 871,106. The filter cartridge includes an envelope placed over a filter frame with appropriate filtration material placed within the envelope. The frame closes onto the top of the envelope and can be held in place by means of the clip 78. The filter cartridge defines a filtering section 80 within the filtering chamber and behind the filter cartridge, and a clean water chamber 82 forward of the filter cartridge.

The clean water accumulates within the clean water chamber 82 until it rises to the level of the spillway 84 and then flows over the spillway across the ledge 86 and back into the aquarium.

In order to bring the water into the intake chamber 68 there is provided a removable unitary intake assembly 90. The intake assembly includes a substantially U-shaped intake tube 92 having a control valve 94 positioned along its upper leg. The forward leg can include a removable strainer extension 94 which extends into the aquarium tank and prevents fish and large debris from being sucked into the aquarium filter. The other end of the intake tube 92 is coupled to an impeller assembly 96 which sits into the intake chamber 68. The impeller is operated by means of a rotor which is magnetically coupled to an electromagnetic stator unit 98 removably coupled to the bottom of the intake chamber 68.

A partition wall 100 is provided between the intake chamber and the filtering chamber. The partition wall extends between the back wall 102 of the filter housing and the notched groove 74 which also defines a forward wall 104 terminating the front of the partition wall 100. The partition wall requires the water filling the intake chamber 68 to rise to the level of the partition wall before flowing into the filtering chamber. By limiting the forward end of the partition wall at the location of the groove 74, it permits the contaminated water flowing from the intake chamber to flow only into the portion of the filtering chamber behind the filter cartridge 76. Thus, none of the contaminated water from the intake chamber can flow into the clean water compartment in front of the filter cartridge.

Because of the presence of the partition wall, the water flowing over the partition wall into the filtering chamber is provided with a circulation so that the debris is distributed throughout the filtering chamber behind the filter cartridge. This provides for a distribution of the debris behind the filter cartridge and permits use of substantially the entire filter cartridge without providing excessive concentration of debris in only one location flowing through the filter cartridge.

Additionally, by separating an intake chamber, it is possible to prime the filter by only requiring a minimal amount of water present in the intake chamber covering the impeller pump. This avoids the necessity of providing a large amount of water that would fill the entire filter in order to start the filter.

As heretofore recited, when the impeller stops the water will siphon out of the intake chamber through the intake tube and back to the aquarium. Drainage of the water from the intake chamber prevents restarting of the filter without again priming the filter. To solve this problem, a narrow passageway 110 is provided in the partition wall 100.

Figure 5:
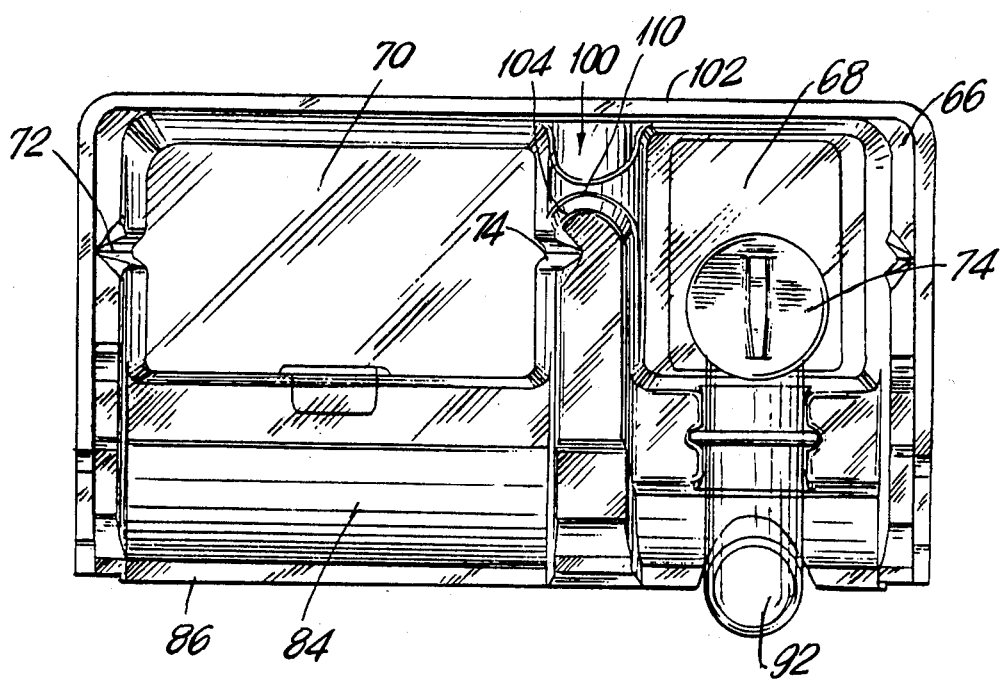
FIG. 5 is a top view of the filter shown in FIG. 2 with the cover removed to permit viewing of the inside of the aquarium filter.
Figure 6:
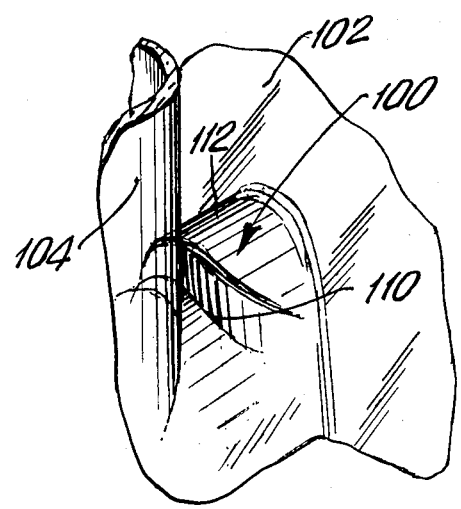
FIG. 6 is an enlarged sectional view of the narrow passageway formed in the partition wall of the aquarium filter of FIG. 2.

The passageway 110 can be seen as a downwardly depending channel extending vertically from the top surface 112 of the partition wall. The passageway includes a narrowing constriction along its width formed by inwardly bowed side walls, as best shown in FIG. 5. In this way, a very narrow passageway is provided for the trickle flow back from the filtering chamber 72 into the intake chamber 68. This flow is at a lower rate than the siphoning flow out of the intake chamber whereby the siphon will break before the trickle flow stops so that the trickle flow has an opportunity to provide sufficient water to the intake chamber to prime it for restarting. Thus, if the stoppage was because of a power failure, as soon as the power resumes the filter will restart by itself. If the stoppage was because of a blockage, the filter will not restart until the blockage is cleared. However, until it is cleared, the trickle flow will provide a flow into the well of the electromagnetic stator unit 98 as well as water above that unit at the bottom of the intake chamber, to provide a cooling effect on the electromagnetic unit and avoid heat damage to the filter housing from the operation of the electromagnetic stator during the blockage. After the blockage is cleared, the water from the trickle flow will provide the priming to restart the filter.

Referring now to FIGS. 7 and 8, there is shown another embodiment of interconnecting the strainer 94 to the distal end of the intake tube 92. An outwardly flared skirt portion 120 is provided at the end of the intake tube 92 adjacent the lower stem 122 which is inserted within the mouth 124 of the strainer 94. The outward edge of the skirt 120 is sized proximate the outer diameter of the mouth portion 124 to provide a continuous smooth coupling connector between the intake tube and the strainer. The inwardly directed tongues 126, 128 will grasp within the annular groove 130 to retain the strainer in place.

Because of the smooth connection between the end of the intake tube and the strainer, upon lifting of the intake assembly out of the filter there will be avoided a shoulder projection which could snag a ledge of the filter and cause a dislodging of the strainer portion from the end of the intake assembly.

There has been disclosed heretofore the best embodiment of the invention presently contemplated. However, it is to be understood that various changes and modifications may be made thereto without departing from the spirit of the invention.

What is claimed is:

1. An aquarium filter for mounting externally of an aquarium tank, comprising an intake chamber for receiving contaminated aquarium water from the aquarium tank, an intake tube supplying aquarium water to the intake chamber, pump means for drawing the aquarium water into the intake chamber through the intake tube, a filtering chamber in flow communication with the intake chamber for filtering of the contaminated water to return clean water back to the aquarium tank, a partition wall between the intake chamber and the filtering chamber for the water filling the intake chamber to overflow into the filtering chamber, means for maintaining water in the filtering chamber directly on the other side of the partition wall upon draining out of the water from the intake chamber due to the filter halting its operation, and a narrow passageway means through the top of the partition wall for providing a limited reverse flow of water from the filtering chamber